C. HOWARD.

Horse Rake.

No. 67,305.

Patented July 30, 1867.

WITNESSES:
Alex F. Roberts
Fred D. Miles

INVENTOR.
Chas Howard
Per Munn & Co Atty's

United States Patent Office

CHARLES HOWARD, OF BEARSVILLE, NEW YORK.

Letters Patent No. 67,305, dated July 30, 1867.

---

IMPROVEMENT IN HORSE-RAKES.

---

The Schedule referred to in these Letters Patent and making part of the same.

---

TO ALL WHOM IT MAY CONCERN:

Be it known that I, CHARLES HOWARD, of Bearsville, in the county of Ulster, and State of New York, have invented a new and useful Improvement in Revolving Horse Hay-Rake; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
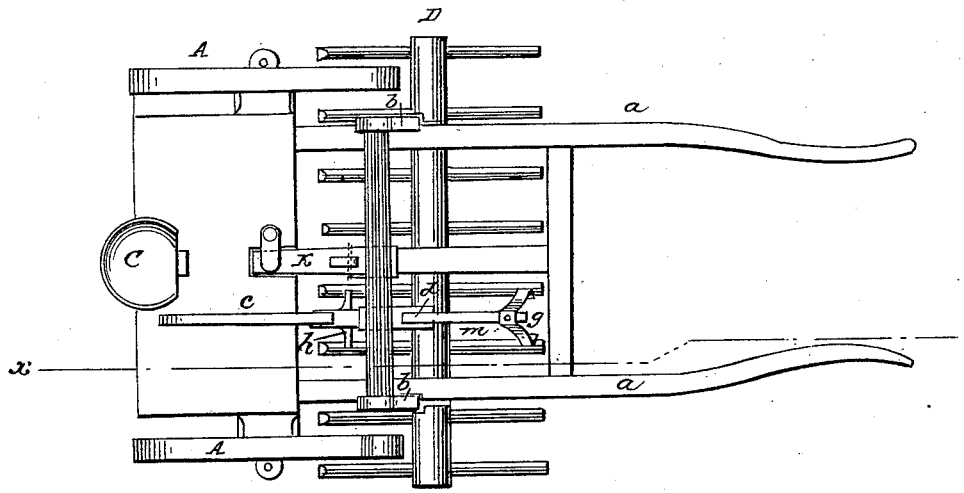
Figure 1 is a top view of my improved hay-rake.
Figure 2:
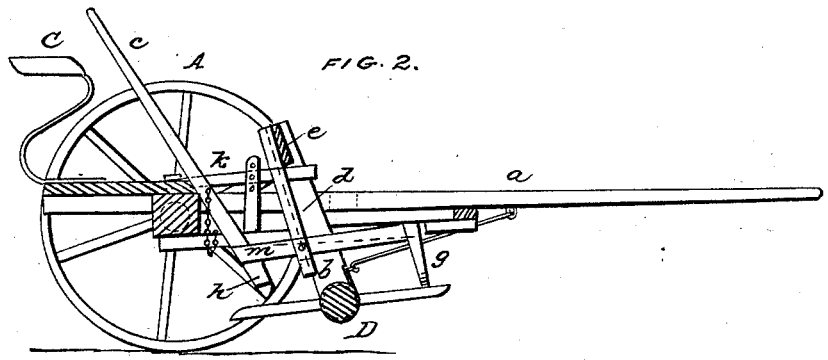
Figure 2 is a vertical longitudinal section taken in the line $x$ $x$, fig. 1, showing the rake in position for working.
Figure 3:
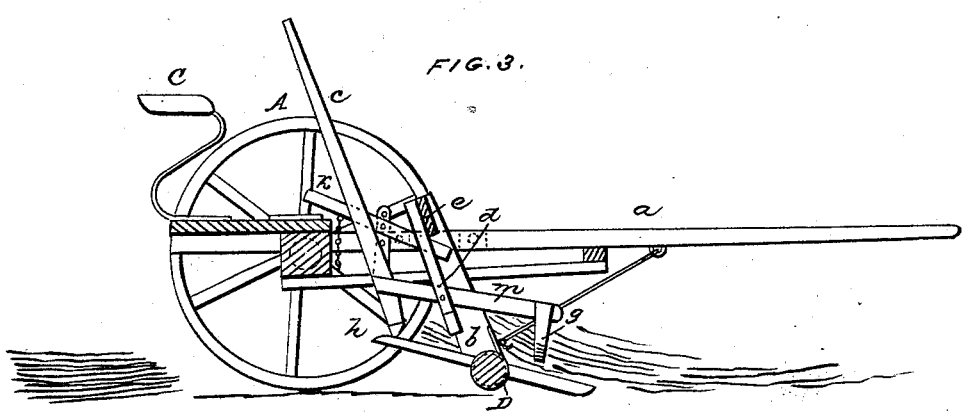
Figure 3 is a similar view, showing the rake in position for clearing the ground when transported.

This invention relates to an improvement in the construction of horse hay-rakes, which consists in an arrangement of a lever for keeping the rake in position, for raking and tripping it when loaded, so that it shall turn over and deposit its load to be instantly ready for going on with the operation of raking, and also of a lever for raising and lowering the rake-head to clear the ground and allow the rake to be moved from place to place without striking the teeth. The general arrangement of the machine is also exceedingly simple, and may be manufactured cheaply and managed easily, so as to rake clean and rapidly.

A A are two driving-wheels, mounted on the axle B, to which are directly attached the thills $a$ $a$ for one horse, and in the rear is the driver's seat C. D is the rake-head of a double rake, that is hung to revolve in the lower ends of two upright sliding bars $b$ $b$, which pass through slots in the thills $a$ $a$, directly in front of the wheels A A. A hand-lever, $c$, is fastened to a rock-bar, $m$, pivoted in a hanger, $d$, fastened to the cap-piece $e$ of the vertical sliding bars $b$ $b$; and on the front end of the rock-bar $m$, which extends forward of the rake-head D, are attached a pair of spring tongs, $g$; on the lower end of the lever $c$ is also attached a cross-foot, $h$.

When the rake is working the cross-foot rests upon the rear rake-teeth, which are thus held in position until the rake is loaded; the driver then pushes forward the upper end of the lever $c$, which releases the cross-head from the rear rake-teeth, and brings the tongs $g$ down to bear on the load of hay, by which the rake-head D rises with the sliding bars $b$ $b$, and turns over to discharge the load. The cross-foot $h$ again sets on the rear teeth, and the work proceeds without stopping. In order to elevate the rake-teeth above the ground when the rake is moved but not working, a lever, $k$, is provided, which is hung in front of the driver's seat, so as to catch under the cap-piece $e$, and lift the rake by raising the sliding bars $b$ $b$, in which position it is secured for transportation.

Having thus described my invention, I claim as new, and desire to secure by Letters Patent—

The combination of the lever $c$, the cross-foot lever $k$, and the spring-stops $g$, with the sliding bars $b$ $b$ of the rake-head D, and the thills $a$ $a$ of a horse-rake, arranged and operating substantially as herein described.

CHARLES HOWARD.

Witnesses:
EDGAR SNYDER,
GEORGE L. HEATH.